United States Patent
Mochizuki et al.

(10) Patent No.: US 10,722,760 B2
(45) Date of Patent: Jul. 28, 2020

(54) RESIN COMPOSITION FOR GOLF BALLS, AND GOLF BALL

(71) Applicant: Bridgestone Sports Co., Ltd., Tokyo (JP)

(72) Inventors: Katsunobu Mochizuki, Chichibushi (JP); Masahiro Yamabe, Chichibushi (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 16/184,045

(22) Filed: Nov. 8, 2018

(65) Prior Publication Data

US 2019/0184240 A1    Jun. 20, 2019

(30) Foreign Application Priority Data

Dec. 20, 2017   (JP) .................. 2017-244130

(51) Int. Cl.
| | | |
|---|---|---|
| *C08L 75/02* | (2006.01) | |
| *C08L 75/04* | (2006.01) | |
| *A63B 37/00* | (2006.01) | |
| *C08G 18/76* | (2006.01) | |
| *A63B 102/32* | (2015.01) | |

(52) U.S. Cl.
CPC ........ *A63B 37/0094* (2013.01); *A63B 37/004* (2013.01); *A63B 37/0024* (2013.01); *A63B 37/0027* (2013.01); *A63B 37/0029* (2013.01); *A63B 37/0031* (2013.01); *A63B 37/0039* (2013.01); *A63B 37/0043* (2013.01); *C08G 18/7671* (2013.01); *C08L 75/04* (2013.01); *A63B 37/0073* (2013.01); *A63B 37/0074* (2013.01); *A63B 37/0076* (2013.01); *A63B 37/0095* (2013.01); *A63B 2102/32* (2015.10)

(58) Field of Classification Search
CPC .......... C08L 75/02; C08L 75/04; C08L 75/06; C08L 75/08; C08L 75/10; A63B 37/0078; A63B 37/0094; A63B 37/0095; A63B 37/0027; A63B 37/0074; A63B 37/0075; A63B 37/0076

See application file for complete search history.

(56) References Cited

U.S. PATENT DOCUMENTS

| | | | | |
|---|---|---|---|---|
| 4,780,512 A | * | 10/1988 | Gould | C08F 299/06 521/905 |
| 5,944,621 A | * | 8/1999 | Tsujinaka | A63B 37/0003 473/369 |
| 9,770,629 B2 | | 9/2017 | Nanba | |
| 10,124,214 B1 | * | 11/2018 | Sullivan | A63B 37/0033 |
| 10,150,008 B1 | * | 12/2018 | Sullivan | A63B 37/0033 |
| 2002/0187857 A1 | * | 12/2002 | Kuntimaddi | A63B 37/0003 473/373 |
| 2006/0051593 A1 | * | 3/2006 | Peeler | C08F 290/06 428/423.1 |
| 2008/0021161 A1 | * | 1/2008 | Egashira | C08F 8/44 525/125 |
| 2008/0161134 A1 | * | 7/2008 | Tarao | A63B 37/0023 473/378 |
| 2009/0124420 A1 | * | 5/2009 | Kamino | A63B 37/0023 473/374 |
| 2012/0094784 A1 | * | 4/2012 | Hebert | A63B 37/0003 473/374 |
| 2013/0172118 A1 | * | 7/2013 | Ichikawa | A63B 37/0024 473/376 |
| 2014/0113751 A1 | * | 4/2014 | Sullivan | A63B 37/0092 473/376 |
| 2015/0274958 A1 | * | 10/2015 | Henze | C08G 18/664 525/123 |
| 2017/0182367 A1 | | 6/2017 | Namba | |

FOREIGN PATENT DOCUMENTS

| | | |
|---|---|---|
| JP | 2016-119946 A | 7/2016 |
| JP | 2017-113220 A | 6/2017 |

\* cited by examiner

*Primary Examiner* — John E Simms, Jr.
(74) *Attorney, Agent, or Firm* — Sughrue Mion, PLLC

(57) ABSTRACT

A resin composition for golf balls is made of (A) polyurethane or polyurea and (B) an acrylic resin or a methacrylic resin, component (B) being included in an amount of from 0.5 to 50 parts by weight per 100 parts by weight of component (A). In a golf ball having a core and a cover of one or more layer encasing the core, at least one cover layer is formed of this resin composition. The resin composition is especially useful as a golf ball cover material because it makes it possible to achieve a higher ball initial velocity on shots with a driver and a lower ball initial velocity on approach shots.

8 Claims, No Drawings

RESIN COMPOSITION FOR GOLF BALLS, AND GOLF BALL

CROSS-REFERENCE TO RELATED APPLICATION

This non-provisional application claims priority under 35 U.S.C. § 119(a) on Patent Application No. 2017-244130 filed in Japan on Dec. 20, 2017, the entire contents of which are hereby incorporated by reference.

TECHNICAL FIELD

This invention relates to a resin composition for golf balls and to a golf ball which uses the same. More particularly, the invention relates to a golf ball resin composition that can be suitably used as the cover material in golf balls having a core encased by a cover of one or more layers, and to a golf ball which uses such a resin composition.

BACKGROUND ART

The chief characteristic demanded of golf balls is an increased distance, although other desired properties include the ability of the ball to stop well on approach shots and scuff resistance. Many golf balls endowed with a good flight on shots with a driver and a good receptivity to backspin on approach shots have hitherto been developed. In addition, golf ball cover materials possessing a high resilience and a good scuff resistance have been developed.

Today, urethane resin materials are often used in place of ionomer resin materials as the cover material, especially for professional golfers and skilled amateur golfers. However, professional golfers and skilled amateur golfers desire golf balls having even better controllability on approach shots, and so further improvement is sought even among cover materials in which a urethane resin material serves as the base resin. JP-A 2017-113220 discloses a golf ball resin material which includes, as a cover material that endows the ball with excellent controllability around the green when played with a short iron such as a sand wedge (SW) and can also extend the distance traveled by the ball on shots with a driver, a specific styrene-based thermoplastic elastomer and a thermoplastic resin having on the molecule either styrene monomer units or diene monomer units. Also, JP-A 2016-119946 discloses a resin material for golf balls that provides the ball with excellent controllability when hit around the green with a short iron such as a sand wedge.

However, even with such golf ball resin materials, it has not been possible to extend the ball distance by increasing the initial velocity on shots with a driver while also obtaining a high controllability by way reducing the initial velocity on approach shots. Hence, there remains room for further improvement in ball performance, both on shots with a driver and on approach shots.

SUMMARY OF THE INVENTION

It is therefore an object of the present invention to provide a resin material for golf balls that makes it possible to obtain golf balls which can achieve a higher initial velocity on shots with a driver and can also achieve a lower initial velocity on approach shots.

As a result of extensive investigations, we have discovered that by adding a specific amount of an acrylic or methacrylic resin such as polymethyl methacrylate (PMMA) to a resin material containing polyurethane or polyurea as the base resin in order to further improve the polyurethane covers hitherto used, an increased ball initial velocity can be achieved on shots with a driver and a reduced ball initial velocity can be achieved on approach shots, thus making it possible to provide, particularly for professional golfers and skilled amateur golfers, a golf ball that is superior both on shots with a driver and on approach shots.

Accordingly, in one aspect, the invention provides a resin composition for golf balls which includes (A) polyurethane or polyurea, and (B) an acrylic resin or a methacrylic resin, wherein component (A) is the primary component and component (B) is included in an amount of from 0.5 to 50 parts by weight per 100 parts by weight of component (A).

Component (A) is preferably a thermoplastic polyurethane.

Component (A) preferably has a material hardness of 65 or less on the Shore D hardness scale.

Component (B) is preferably one or a combination of two or more selected from the group consisting of polymethyl acrylate, polyethyl acrylate, polypropyl acrylate, polybutyl acrylate, polyisobutyl acrylate, polymethyl methacrylate, polyethyl methacrylate, polypropyl methacrylate and polybutyl methacrylate. Component (B) is more preferably polymethyl methacrylate.

The resin material of component (B) preferably has a Shore D hardness of from 20 to 90.

Component (B) preferably has a rebound resilience, as measured in accordance with JIS-K 6255, of 60% or less.

Component (B) is preferably included in an amount of from 1 to 50 parts by weight per 100 parts by weight of component (A).

The resin composition of the invention may further include (C) an isocyanate compound, in which case component (C) is preferably included in an amount of from 0.1 to 30 parts by weight per 100 parts by weight of component (A).

The resin composition of the invention preferably has a Shore D hardness of not more than 55.

In a second aspect, the invention provides a golf ball having a core and a cover of one or more layers encasing the core, wherein at least one layer of the cover is formed of the resin composition according to the first aspect of the invention.

ADVANTAGEOUS EFFECTS OF THE INVENTION

The resin composition for golf balls of the invention is a resin composition which, given that the ball initial velocity on approach shots falls, the contact time between the ball and the clubface at the time of impact increases and the ball does not fly excessively on approach shots, provides the golf ball with a delicate controllability around the green, and which moreover enables a higher ball initial velocity to be achieved on shots with a driver. The inventive composition is particularly useful as a cover material for golf balls.

DESCRIPTION OF THE PREFERRED EMBODIMENTS

The objects, features and advantages of the invention will become more apparent from the following detailed description.

The golf ball resin composition includes: (A) polyurethane or polyurea, and (B) an acrylic resin or a methacrylic resin.

Component (A) is polyurethane or polyurea. The details are as follows.

Polyurethane

The polyurethane has a structure which includes soft segments composed of a polymeric polyol (polymeric glycol) that is a long-chain polyol, and hard segments composed of a chain extender and a polyisocyanate. Here, the long-chain polyol serving as a starting material may be any that has hitherto been used in the art relating to polyurethane materials, and is not particularly limited. This is exemplified by polyester polyols, polyether polyols, polycarbonate polyols, polyester polycarbonate polyols, polyolefin polyols, conjugated diene polymer-based polyols, castor oil-based polyols, silicone-based polyols and vinyl polymer-based polyols. Specific examples of polyester polyols that may be used include adipate-type polyols such as polyethylene adipate glycol, polypropylene adipate glycol, polybutadiene adipate glycol and polyhexamethylene adipate glycol; and lactone-type polyols such as polycaprolactone polyol. Examples of polyether polyols include polyethylene glycol), poly(propylene glycol), poly(tetramethylene glycol) and poly(methyltetramethylene glycol). Such long-chain polyols may be used singly, or two or more may be used in combination.

It is preferable for the long-chain polyol to have a number-average molecular weight in the range of 1,000 to 5,000. By using a long-chain polyol having a number-average molecular weight in this range, golf balls made with a polyurethane composition that has various excellent properties, including a good rebound and a good productivity, can be reliably obtained. The number-average molecular weight of the long-chain polyol is more preferably in the range of 1,500 to 4,000, and even more preferably in the range of 1,700 to 3,500.

Here and below, "number-average molecular weight" refers to the number-average molecular weight calculated based on the hydroxyl value measured in accordance with JIS-K1557.

The chain extender is not particularly limited; any chain extender that has hitherto been employed in the art relating to polyurethanes may be suitably used as the chain extender. In this invention, low-molecular-weight compounds with a molecular weight of 2,000 or less which have on the molecule two or more active hydrogen atoms capable of reacting with isocyanate groups may be used. Of these, preferred use can be made of aliphatic diols having from 2 to 12 carbon atoms. Specific examples include 1,4-butylene glycol, 1,2-ethylene glycol, 1,3-butanediol, 1,6-hexanediol and 2,2-dimethyl-1,3-propanediol. Of these, the use of 1,4-butylene glycol is especially preferred.

Any polyisocyanate hitherto employed in the art relating to polyurethanes may be suitably used without particular limitation as the polyisocyanate. For example, use may be made of one or more selected from the group consisting of 4,4'-diphenylmethane diisocyanate, 2,4-toluene diisocyanate, 2,6-toluene diisocyanate, p-phenylene diisocyanate, xylylene diisocyanate, 1,5-naphthylene diisocyanate, tetramethylxylene diisocyanate, hydrogenated xylylene diisocyanate, dicyclohexylmethane diisocyanate, tetramethylene diisocyanate, hexamethylene diisocyanate, isophorone diisocyanate, norbornene diisocyanate, trimethylhexamethylene diisocyanate, 1,4-bis(isocyanatomethyl)cyclohexane and dimer acid diisocyanate. However, depending on the type of isocyanate, crosslinking reactions during injection molding may be difficult to control.

The ratio of active hydrogen atoms to isocyanate groups in the polyurethane-forming reaction may be suitably adjusted within a preferred range. Specifically, in preparing a polyurethane by reacting the above long-chain polyol, polyisocyanate and chain extender, it is preferable to use the respective components in proportions such that the amount of isocyanate groups included in the polyisocyanate per mole of active hydrogen atoms on the long-chain polyol and the chain extender is from 0.95 to 1.05 moles.

The method for preparing the polyurethane is not particularly limited. Preparation using the long-chain polyol, chain extender and polyisocyanate may be carried out by either a prepolymer process or a one-shot process via a known urethane-forming reaction. Of these, melt polymerization in the substantial absence of solvent is preferred. Production by continuous melt polymerization using a multiple screw extruder is especially preferred.

A thermoplastic polyurethane material is preferably used as the polyurethane. The thermoplastic polyurethane material may be a commercial product, examples of which include those available under the trade name Pandex from DIC Covestro Polymer, Ltd., and those available under the trade name Resamine from Dainichiseika Color & Chemicals Mfg. Co., Ltd.

Polyurea

The polyurea is a resin composition composed primarily of urea linkages formed by reacting (i) an isocyanate with (ii) an amine-terminated compound. This resin composition is described in detail below.

(i) Isocyanate

The isocyanate is preferably one that is used in the prior art relating to polyurethanes, but is not particularly limited. Use may be made of isocyanates similar to those mentioned above in connection with the polyurethane material.

(ii) Amine-Terminated Compound

An amine-terminated compound is a compound having an amino group at the end of the molecular chain. In this invention, the long-chain polyamines and/or amine curing agents shown below may be used.

The long-chain polyamine is an amine compound which has on the molecule at least two amino groups capable of reacting with isocyanate groups, and which has a number-average molecular weight of from 1,000 to 5,000. In this invention, the number-average molecular weight is more preferably from 1,500 to 4,000, and even more preferably from 1,900 to 3,000. Examples of such long-chain polyamines include, but are not limited to, amine-terminated hydrocarbons, amine-terminated polyethers, amine-terminated polyesters, amine-terminated polycarbonates, amine-terminated polycaprolactones, and mixtures thereof. These long-chain polyamines may be used singly, or two or more may be used in combination.

The amine curing agent is an amine compound which has on the molecule at least two amino groups capable of reacting with isocyanate groups, and which has a number-average molecular weight of less than 1,000. In this invention, the number-average molecular weight is more preferably less than 800, and even more preferably less than 600. Such amine curing agents include, but are not limited to, ethylenediamine, hexamethylenediamine, 1-methyl-2,6-cyclohexyldiamine, tetrahydroxypropylene ethylenediamine, 2,2,4- and 2,4,4-trimethyl-1,6-hexanediamine, 4,4'-bis(sec-butylamino)dicyclohexylmethane, 1,4-bis(sec-butylamino) cyclohexane, 1,2-bis(sec-butylamino)cyclohexane, derivatives of 4,4'-bis(sec-butylamino)dicyclohexylmethane, 4,4'-dicyclohexylmethanediamine, 1,4-cyclohexane bis (methylamine), 1,3-cyclohexane bis(methylamine), diethylene glycol di(aminopropyl) ether, 2-methylpentamethylenediamine, diaminocyclohexane, diethylenetriamine, triethylenetetramine, tetraethylenepentamine, propylenediamine, 1,3-diaminopropane, dimethylaminopropylamine, diethylaminopropylamine, dipropylenetriamine, imidobis(propylamine), monoethanolamine, diethanolamine, triethanolamine, monoisopropanolamine, diisopropanolamine, isophoronediamine, 4,4'-methylenebis(2-chloroaniline), 3,5-dimethylthio-2,4-toluenediamine, 3,5-dimethylthio-2,6-toluenediamine, 3,5-diethylthio-2,4-toluenediamine, 3,5-diethylthio-2,6-toluenediamine, 4,4'-bis(sec-butylamino)diphenylmethane and derivatives thereof, 1,4-bis(sec-butylamino)benzene, 1,2-bis(sec-butylamino)benzene, N,N'-dialkylaminodiphenylmethane, N,N,N',N'-tetrakis(2-hydroxypropy)ethylenediamine, trimethylene glycol di-p-aminobenzoate, polytetramethylene oxide di-p-aminobenzoate, 4,4'-methylenebis(3-chloro-2,6-diethyleneaniline), 4,4'-methylenebis(2,6-diethylaniline), m-phenylenediamine, p-phenylenediamine and mixtures thereof. These amine curing agents may be used singly or two or more may be used in combination.

(iii) Polyol

Although not an essential ingredient, in addition to the above-described components (i) and (ii), a polyol may also be included in the polyurea. The polyol is not particularly limited, but is preferably one that has hitherto been used in the art relating to polyurethanes. Specific examples include the long-chain polyols and/or polyol curing agents mentioned below.

The long-chain polyol may be any that has hitherto been used in the art relating to polyurethanes. Examples include, but are not limited to, polyester polyols, polyether polyols, polycarbonate polyols, polyester polycarbonate polyols, polyolefin-based polyols, conjugated diene polymer-based polyols, castor oil-based polyols, silicone-based polyols and vinyl polymer-based polyols. These long-chain polyols may be used singly or two or more may be used in combination.

The long-chain polyol has a number-average molecular weight of preferably from 1,000 to 5,000, and more preferably from 1,700 to 3,500. In this average molecular weight range, an even better resilience and productivity are obtained.

The polyol curing agent is preferably one that has hitherto been used in the art relating to polyurethanes, but is not subject to any particular limitation. In this invention, use may be made of a low-molecular-weight compound having on the molecule at least two active hydrogen atoms capable of reacting with isocyanate groups, and having a molecular weight of less than 1,000. Of these, the use of aliphatic diols having from 2 to 12 carbon atoms is preferred. Specific examples include 1,4-butylene glycol, 1,2-ethylene glycol, 1,3-butanediol, 1,6-hexanediol and 2,2-dimethyl-1,3-propanediol. The use of 1,4-butylene glycol is especially preferred. The polyol curing agent has a number-average molecular weight of preferably less than 800, and more preferably less than 600.

A known method may be used to produce the polyurea. A prepolymer process, a one-shot process or some other known method may be suitably selected for this purpose.

Component (A) has a material hardness on the Shore D scale which, in terms of the spin characteristics and scuff resistance obtained in the golf ball, is preferably not more than 65, more preferably not more than 60, and even more preferably not more than 55. The lower limit in the Shore D hardness, from the standpoint of moldability, is preferably at least 25, and more preferably at least 30.

Component (A) serves as the primary component of the resin composition. To sufficiently confer the scuff resistance of urethane resin, component (A) accounts for at least 50 wt %, preferably at least 60 wt %, more preferably at least 70 wt %, even more preferably at least 80 wt %, and most preferably at least 90 wt %, of the resin composition.

In this invention, by adding component (B) described in detail below to above component (A), a higher initial velocity can be achieved on shots with a driver and a lower initial velocity can be achieved on approach shots.

The resin material used as component (B) is an acrylic resin or a methacrylic resin. These resins are exemplified by, without particular limitation, polymers of methyl methacrylate and polymers of alkyl esters of acrylic acid or alkyl esters of methacrylic acid. Preferred resin materials include those composed of an acrylic acid ester having an organic group of from 1 to 8 carbon atoms, and those composed of a methacrylic acid ester in which the number of carbon atoms on the alkyl group is from 1 to 4. Exemplary acrylic resins include polymethyl acrylate, polyethyl acrylate, polypropyl acrylate, polybutyl acrylate and polyisobutyl acrylate. Exemplary methacrylic resins include polymethyl methacrylate, polyethyl methacrylate, polypropyl methacrylate, polybutyl methacrylate and polyisobutyl methacrylate. These may be used singly or two or more may be used in combination.

Of these resins, the use of polymethyl methacrylate (PMMA) is preferred.

A commercial product may be used as the resin material of component (B). Specific examples of commercial products include those available under the trade name Parapet from Kuraray Co., Ltd., Sumipex™ from Sumitomo Chemical Co., Ltd., Delpet™ from Asahi Kasei Corporation, and Acrypet™ from Mitsubishi Chemical.

Component (B) has a Shore D hardness of preferably not more than 90, more preferably not more than 85, and even more preferably not more than 80. The lower limit is preferably at least 20.

Component (B) has a rebound resilience, as measured according to JIS-K 6255, of preferably not more than 60%, more preferably not more than 55%, even more preferably not more than 50%, and most preferably not more than 45%. By holding down the rebound resilience in this way, when compound (B) is added in a small amount, a reduction in the ball initial velocity on approach shots can be achieved without adversely affecting the ball properties. To prevent a decline in the rebound and a decrease in the distance traveled by the ball on shots with a driver, the lower limit in the rebound resilience is preferably at least 20%.

It is critical for the content of component (B) per 100 parts by weight of component (A) to be from 0.5 to 50 parts by weight. This content is preferably from 1 to 25 parts by weight, and more preferably from 2 to 10 parts by weight. When the component (B) content is low, the ball initial velocity-lowering effect on approach shots becomes lower as well. Also, this resin composition fully supports the scuff resistance properties possessed by the urethane resin of component (A) serving as the main component, and so an excessive content of component (B) may result in a loss of scuff resistance.

Another resin material may be included in addition to above components (A) and (B). The purpose of doing so is to, for example, further improve the flowability of the golf ball resin composition and to increase various golf ball properties such as rebound and scuff resistance.

The other resin material may be selected from among polyester elastomers, polyamide elastomers, ionomer resins, ethylene-ethylene/butylene-ethylene block copolymers or modified forms thereof, polyacetals, polyethylenes, nylon resins, styrene resins, polyvinyl chlorides, polycarbonates, polyphenylene ethers, polyarylates, polysulfones, polyethersulfones, polyetherimides and polyamide-imides. These may be used singly or two or more may be used together.

The combined amount of the base resin consisting of components (A) and (B) as a proportion of the overall resin composition is not particularly limited, although it is recommended that components (A) and (B) be included in a combined amount of at least 60 wt %, preferably at least 70 wt %, more preferably at least 80 wt %, and most preferably at least 90 wt %. When the combined amount is inadequate, the desired effects of the invention may not be obtained.

In addition to components (A) and (B), the resin composition of the invention may also include an isocyanate compound as component (C). The reason is that reaction between the polyurethane or polyurea of component (A) and an isocyanate compound can further increase the scuff resistance of the resin composition. Moreover, due to the plasticizing effect of isocyanate, the flowability of the resin composition can be increased, enabling the moldability to be improved.

Any isocyanate compound employed in conventional polyurethanes may be used without particular limitation as the isocyanate compound (C). Examples of aromatic isocyanate compounds include 2,4-toluene diisocyanate, 2,6-toluene diisocyanate and mixtures of both, 4,4-diphenylmethane diisocyanate, m-phenylene diisocyanate and 4,4'-biphenyl diisocyanate. Use can also be made of the hydrogenated forms of these aromatic isocyanate compounds, such as dicyclohexylmethane diisocyanate. Other examples of isocyanate compounds that may be used include aliphatic diisocyanates such as tetramethylene diisocyanate, hexatnethylene diisocyanate (HDI) and octamethylene diisocyanate; and alicyclic diisocyanates such as xylene diisocyanate. Further examples of isocyanate compounds that may be used include blocked isocyanate compounds obtained by reacting the isocyanate groups on a compound having two or more isocyanate groups on the ends with a compound having active hydrogens, and uretdiones obtained by the dimerization of isocyanate.

The amount of the isocyanate compound (C) included per 100 parts by weight of component (A) is preferably at least 0.1 part by weight, and more preferably at least 0.5 part by weight. The upper limit is preferably not more than 30 parts by weight, and more preferably not more than 20 parts by weight. When too little is included, a sufficient crosslinking reaction may not be obtained and an increase in the properties may not be observable. On the other hand, when too much is included, discoloration over time due to heat and ultraviolet light may increase, or problems may arise such as a loss of thermoplasticity or a decline in resilience.

In addition, depending on the intended use of the golf ball resin composition of the invention, optional additives may be suitably included in the composition. For example, when the resin composition for golf balls of the invention is to be used as a cover material, various types of additives, such as fillers (inorganic fillers), organic staple fibers, reinforcing agents, crosslinking agents, pigments, dispersants, antioxidants, ultraviolet absorbers and light stabilizers, may be added to the foregoing ingredients. When such additives are included, the amount thereof, per 100 parts by weight of the base resin, is preferably at least 0.1 part by weight, and more preferably at least 0.5 part by weight, but preferably not more than 10 parts by weight, and more preferably not more than 4 parts by weight.

Mixture and preparation of components (A) and (B) may involve, for example, mixture using any of various types of mixers, such as a kneading-type single-screw or twin-screw extruder, a Banbury mixer, a kneader or a Labo Plastomill. Alternatively, both ingredients may be mixed by dry blending at the time that the resin composition is injection molded. In addition, when component (C) is used, it may be incorporated at the time of resin mixture using various types of mixers, or a masterbatch containing components (B) and (C) may be separately prepared and components (A) to (C) mixed together by dry blending at the time that the resin composition is injection molded.

The golf ball resin composition of the invention may be used as the resin material for various members of the golf ball. For example, aside from using it as the material for a one-piece golf ball itself, the inventive composition can be suitably used as the cover stock for a two-piece solid golf ball consisting of a core and a cover encasing the core, or as the cover stock in a multi-piece solid golf ball consisting of a core of one or more layer and a multilayer cover encasing the core.

The method of molding such a cover may entail, for example, feeding the above-described resin composition to an injection molding machine and injecting the molten resin composition over the core. In this case, the molding temperature varies depending on the type of polyurethane, polyurea or the like serving as component (A), but is generally in the range of 150° C. to 270° C.

EXAMPLES

The following Working Examples and Comparative Examples are provided to illustrate the invention, and are not intended to limit the scope thereof.

Working Examples 1 to 6, Comparative Examples I and II

Cores having a diameter of 38.6 mm were produced by preparing and molding/vulcanizing a core rubber composition formulated as shown in Table 1 which was common to all of the Examples.

TABLE 1

| Rubber composition | Parts by weight |
| --- | --- |
| cis-1,4-Polybutadiene | 100 |
| Zinc acrylate | 27 |
| Zinc oxide | 4.0 |
| Barium sulfate | 16.5 |
| Antioxidant | 0.2 |
| Organic Peroxide (1) | 0.6 |
| Organic Peroxide (2) | 1.2 |
| Zinc salt of pentachlorothiophenol | 0.3 |
| Zinc stearate | 1.0 |

Details on the above core materials are given below.

cis-1,4-Polybutadiene: Available under the trade name "BR01" from JSR Corporation Zinc acrylate: Available from Nippon Shokubai Co., Ltd.

Zinc oxide: Available from Sakai Chemical Co., Ltd.

Barium sulfate: Available from Sakai Chemical Co., Ltd.

Antioxidant: Available under the trade name "Nocrac NS-6" from Ouchi Shinko Chemical Industry Co., Ltd.

Organic Peroxide (1): Dicumyl peroxide, available under the trade name "Percumyl D" from NOF Corporation Organic Peroxide (2): A mixture of 1,1-di(tert-butylperoxy) cyclohexane and silica, available under the trade name "Perhexa C-40" from NOF Corporation Zinc stearate: Available from NOF Corporation Next, an intermediate layer-forming resin material common to all of the Examples was prepared. This intermediate layer-forming resin material was a blend of 50 parts by weight of a sodium-neutralized product of an ethylene-unsaturated carboxylic acid copolymer having an acid content of 18 wt % and 50 pans by weight of a zinc-neutralized product of an ethylene-unsaturated carboxylic acid copolymer having an acid content of 15 wt %, the combined amount of both resins being 100 parts by weight. This resin material was injection-molded over the 38.6 mm diameter core obtained as described above, thereby producing an intermediate layer-encased sphere having a 1.25 mm thick intermediate layer.

Next, the cover materials formulated as shown in Table 2 below were injection-molded over the intermediate layer-encased spheres, thereby producing three-piece golf balls having a 0.8 mm thick cover layer (outermost layer). Dimples common to all the Examples were formed at this time on the surface of the cover in each Working Example and Comparative Example.

Preparation of Cover Resin Composition

The resin composition was prepared by dry blending component (B) with a thermoplastic polyurethane resin composition consisting of components (A) and (C) in the types and amounts shown in Table 2, and the resulting composition was injection molded.

The ball deflection, initial velocity on shots with a driver and initial velocity on approach shots were measured for the golf balls obtained in the respective Working Examples and Comparative Examples. In Working Examples 1 to 6, the amount of change in these values relative to Comparative Example I as the reference was determined. In addition, the scuff resistance, distance, controllability on approach shots and moldability were evaluated as shown below. These results are presented in Table 2.

Ball Diameter

The diameters at 15 random dimple-free areas on the surface of a ball were measured at a temperature of 23.9±1° C. and, using the average of these measurements as the measured value for a single ball, the average diameter for five measured balls was determined.

Ball Deflection

The ball was placed on a hard plate and the amount of deflection (mm) when compressed under a final load of 1,275 N (130 kgf) from an initial load of 98 N (10 kgf) was measured. The amount of deflection here refers to the measured value obtained after holding the specimen isothermally at 23.9° C.

Measurement of Initial Velocity and Distance on Shots with a Driver

The initial velocity of the ball immediately after being struck at a head speed (HS) of 45 m/s with a driver mounted on a swing robot was measured using an apparatus for measuring the initial conditions. The distance traveled by the ball was measured as well.

Initial Velocity and Evaluation of Controllability on Approach Shots

A sand wedge (SW) was mounted on a golf swing robot and the initial velocity of the ball immediately after being struck at a head speed (HS) of 20 m/s was measured with an apparatus for measuring the initial conditions. In addition, an evaluation of the ball controllability with the club on approach shots was carried out according to the criteria shown below.

Exc: Excellent controllability
Good: Good controllability
NG: Somewhat poor controllability Evaluation of Scuff Resistance The golf balls were held isothermally at 23° C. and five balls of each type were hit at a head speed of 33 m/s using as the club a pitching wedge mounted on a swing robot machine. The damage to the ball from the impact was visually rated according to the following criteria.

Exc: Damage is very slight or substantially not apparent.
Good: Some fraying of surface or loss of dimples.
NG: Dimples are completely obliterated in places.

Evaluation of Moldability (Mold Releasability)

Releasability from the mold following injection molding of the cover was rated according to the following criteria.

Exc: External defects such as runner stubs and ejector pin marks do not arise during demolding.
Good: External defects such as runner stubs and ejector pin marks arise during demolding, but molding proceeds without difficulty.
NG: External defects such as runner stubs and ejector pin marks arise during demolding, making molding impossible.

TABLE 2

| | | Comp. Example | Working Example | | | | | | Comp. Example |
|---|---|---|---|---|---|---|---|---|---|
| | | I | 1 | 2 | 3 | 4 | 5 | 6 | II |
| Core | Diameter (mm) | 38.6 | 38.6 | 38.6 | 38.6 | 38.6 | 38.6 | 38.6 | 38.6 |
| | Weight (g) | 34.9 | 34.9 | 34.9 | 34.9 | 34.9 | 34.9 | 34.9 | 34.9 |
| Intermediate layer-encased sphere | Diameter (mm) | 41.1 | 41.1 | 41.1 | 41.1 | 41.1 | 41.1 | 41.1 | 41.1 |
| | Weight (g) | 40.6 | 40.6 | 40.6 | 40.6 | 40.6 | 40.6 | 40.6 | 40.6 |
| Cover (outermost layer) | Component (A) | TPU | TPU | TPU | TPU | TPU | TPU | TPU | TPU |
| | Component (B) | none | PMMA1 | PMMA2 | PMMA2 | PMMA2 | PMMA2 | PMMA3 | PEs |
| | Component (C) | MDI | MDI | MDI | MDI | MDI | MDI | MDI | MDI |
| | (B)/(A) ratio (pbw) | 0/100 | 3/100 | 3/100 | 5/100 | 10/100 | 25/100 | 3/100 | 3/100 |
| | (C)/(A) ratio (pbw) | 7.5/100 | 7.5/100 | 7.5/100 | 7.5/100 | 7.5/100 | 7.5/100 | 7.5/100 | 7.5/100 |
| Resin properties | Shore D hardness of component (A) | 40 | 40 | 40 | 40 | 40 | 40 | 40 | 40 |
| | Rebound resilience of component (B) (%) | — | 23 | 31 | 24 | 25 | 26 | 31 | 77 |
| | Shore D hardness of component (B) | — | 40 | 87 | 87 | 87 | 87 | 80 | 37 |

TABLE 2-continued

|  |  | Comp. Example I | Working Example 1 | Working Example 2 | Working Example 3 | Working Example 4 | Working Example 5 | Working Example 6 | Comp. Example II |
|---|---|---|---|---|---|---|---|---|---|
|  | Shore D hardness of cover material | 40 | 41 | 41 | 42 | 44 | 51 | 41 | 42 |
| Ball properties | Diameter (mm) | 42.73 | 42.72 | 42.74 | 42.72 | 42.72 | 42.72 | 42.72 | 42.74 |
|  | Weight (g) | 45.45 | 45.33 | 45.44 | 45.36 | 45.35 | 45.34 | 45.34 | 45.39 |
|  | Deflection (mm) | 2.72 | 2.69 | 2.68 | 2.70 | 2.69 | 2.70 | 2.69 | 2.72 |
| Ball evaluation | DR initial velocity (m/sec) | 66.82 | 66.90 | 66.90 | 66.91 | 66.93 | 66.98 | 66.97 | 66.85 |
|  | AP initial velocity (m/sec) | 19.18 | 19.12 | 19.11 | 19.11 | 19.07 | 19.00 | 19.10 | 19.18 |
|  | Change in DR initial velocity (m/sec) | — | 0.08 | 0.08 | 0.09 | 0.11 | 0.16 | 0.15 | 0.03 |
|  | Change in AP initial velocity (m/sec) | — | −0.06 | −0.07 | −0.07 | −0.11 | −0.18 | −0.08 | 0.00 |
|  | Scuff resistance | Exc | Exc | Exc | Exc | Exc | Good | Exc | Exc |
|  | Distance (m) | 230 | 232 | 232 | 232 | 233 | 235 | 234 | 230 |
|  | Controllability on approach shots | NG | Exc | Exc | Exc | Exc | Exc | Exc | NG |
|  | Moldability (mold releasability) | Exc | Exc | Exc | Exc | Exc | Good | Exc | Exc |

DR initial velocity: Initial velocity on shots with a driver
AP initial velocity: Initial velocity on approach shots with an iron Trade names for the chief materials in the table are as follows.
TPU: An ether-type thermoplastic polyurethane available under the trade name Pandex from DIC Covestro Polymer, Ltd.; Shore D hardness, 40
MDI: 4,4′-Diphenylmethane diisocyanate (an isocyanate compound)
PMMA1: A methacrylic resin available from Kuraray Co., Ltd. under the trade name Parapet Soft Acryl SA-NW201; Shore D hardness, 40
PMMA2: A methacrylic resin available from Kuraray Co., Ltd. under the trade name Parapet GF; Shore D hardness, 87
PMMA3: A methacrylic resin available from Kuraray Co., Ltd. under the trade name Parapet GR04940; Shore D hardness, 80
PEs: A polyester elastomer available from DuPont-Toray Co., Ltd. under the trade name Hytrel 4001; Shore D hardness, 37

It is apparent from the results in Table 2 that, in Working Examples 1 to 6, the rebound (initial velocity) on approach shots can be lowered without lowering the rebound (initial velocity) of the ball on shots with a driver and, moreover, the ball initial velocity on shots with a driver can be made higher and the ball initial velocity on approach shots can be made lower than in Comparative Examples I and II, thus extending the distance traveled by the ball on driver shots and providing the ball with an excellent controllability on approach shots.

Japanese Patent Application No. 2017-244130 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A resin composition for golf balls, comprising:
   (A) thermoplastic polyurethane or polyurea, and
   (B) an acrylic resin or a methacrylic resin,
wherein component (A) is the primary component and component (B) is included in an amount of from 2 to 10 parts by weight per 100 parts by weight of component (A), wherein the component (B) is one or a combination of two or more selected from the group consisting of polymethyl acrylate, polyethyl acrylate, polypropyl acrylate, polybutyl acrylate, polyisobutyl acrylate, polymethyl methacrylate, polyethyl methacrylate, polypropyl methacrylate and polybutyl methacrylate, and wherein the resin material of component (B) has a Shore D hardness of from 80 to 90.

2. The resin composition of claim 1, wherein component (A) has a material hardness of 65 or less on the Shore D hardness scale.

3. The resin composition of claim 1, wherein component (B) is polymethyl methacrylate.

4. The resin composition of claim 1, wherein component (B) has a rebound resilience, as measured in accordance with JIS-K 6255, of 60% or less.

5. The resin composition of claim 1, further comprising (C) an isocyanate compound.

6. The resin composition of claim 5, wherein component (C) is included in an amount of from 0.1 to 30 parts by weight per 100 parts by weight of component (A).

7. The resin composition of claim 1 which has a Shore D hardness of not more than 55.

8. A golf ball comprising a core and a cover of one or more layers encasing the core, wherein at least one layer of the cover is formed of the resin composition of claim 1.

* * * * *